United States Patent
Eickholt et al.

(10) Patent No.: US 10,322,744 B2
(45) Date of Patent: Jun. 18, 2019

(54) ROAD WHEEL ACTUATOR ASSEMBLY

(71) Applicant: Steering Solutions IP Holding Corporation, Saginaw, MI (US)

(72) Inventors: Michael A. Eickholt, New Lothrop, MI (US); Fred N. Golda, Bay City, MI (US); Paul E. Kern, Reese, MI (US); Jeffrey L. Marr, Merrill, MI (US); Jeffrey M. Otto, Auburn, MI (US); Emily N. Stilwell, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/619,254

(22) Filed: Jun. 9, 2017

(65) Prior Publication Data

US 2018/0354548 A1    Dec. 13, 2018

(51) Int. Cl.
| | | |
|---|---|---|
| *B62D 5/04* | (2006.01) | |
| *B62D 3/12* | (2006.01) | |
| *F16H 7/02* | (2006.01) | |
| *F16H 25/22* | (2006.01) | |
| *F16H 55/36* | (2006.01) | |
| *F16H 25/20* | (2006.01) | |

(52) U.S. Cl.
CPC .............. *B62D 5/0448* (2013.01); *B62D 3/12* (2013.01); *B62D 5/0424* (2013.01); *F16H 7/02* (2013.01); *F16H 25/2204* (2013.01); *F16H 55/36* (2013.01); *F16H 2025/2096* (2013.01); *F16H 2055/366* (2013.01)

(58) Field of Classification Search
CPC ....... B62D 5/0448; B62D 5/0424; B62D 3/12
USPC .................................................. 180/443, 444
See application file for complete search history.

(56) References Cited

U.S. PATENT DOCUMENTS

| | | | |
|---|---|---|---|
| 2005/0247514 A1* | 11/2005 | Heitzer ................ | B62D 5/0424 180/444 |
| 2014/0260728 A1* | 9/2014 | Holm ................... | B62D 5/0448 74/89.23 |
| 2014/0353068 A1* | 12/2014 | Yamamoto ........... | B62D 5/0412 180/444 |
| 2016/0075368 A1* | 3/2016 | Watanabe ............ | B62D 5/0448 180/444 |
| 2017/0029017 A1* | 2/2017 | Pattok .................... | B60T 7/042 |

(Continued)

FOREIGN PATENT DOCUMENTS

| | | |
|---|---|---|
| DE | 102007049114 A1 | 4/2009 |
| DE | 102010034698 A1 | 2/2012 |
| DE | 102011056031 A1 | 6/2013 |

(Continued)

OTHER PUBLICATIONS

Office Action from the German Patent and Trademark Office for DE Application No. 102018113329.4 dated Sep. 28, 2018, 10 pages.

*Primary Examiner* — Tony H Winner
(74) *Attorney, Agent, or Firm* — Cantor Colburn LLP

(57) ABSTRACT

A pulley assembly for a road wheel actuator assembly includes a driven pulley assembly, a driven pulley, and a belt. The driven pulley assembly includes a driven pulley and a retainer. The driven pulley is at least partially disposed about a ball nut that is operatively connected to a rack bar. The retainer is received within the driven pulley. The belt is arranged to connect the driven pulley assembly to the drive pulley.

14 Claims, 3 Drawing Sheets

(56) References Cited

U.S. PATENT DOCUMENTS

2018/0086365 A1* 3/2018 Lam .................. B62D 5/0424

FOREIGN PATENT DOCUMENTS

| | | |
|---|---|---|
| DE | 102013112880 A1 | 6/2015 |
| DE | 102016007542 A1 | 12/2017 |

* cited by examiner

ROAD WHEEL ACTUATOR ASSEMBLY

BACKGROUND

Vehicle power assist systems such as an electric power steering system may include an actuator having a synchronous belt that transmits a torque from the electric motor to a component. The actuator assists in applying a torque or load to the component to perform vehicle a function such as turning or steering. Skipping or slipping of the synchronous belt may affect the provision of assistance by the vehicle power assist system to aid in turning or steering of the vehicle.

Accordingly, it is desirable to provide a robust vehicle power assist system.

SUMMARY

According to an embodiment of the present disclosure, a steering assist system with a road wheel actuator assembly is provided. The road wheel actuator assembly includes a rack bar that extends along a first axis and a pulley assembly. The pulley assembly includes a drive pulley and a driven pulley assembly. The drive pulley is disposed about a drive pulley shaft that extends along a second axis that is disposed parallel to the first axis. The driven pulley assembly is disposed about the rack bar and includes a ball nut, a driven pulley, and a retainer. The ball nut is disposed about the rack bar. The driven pulley is at least partially disposed about the ball nut. The retainer is at least partially disposed within the driven pulley and is operatively connected to the ball nut.

According to another embodiment of the present disclosure, a pulley assembly of a road wheel actuator assembly is provided. The pulley assembly includes a driven pulley assembly, a driven pulley, and a belt. The driven pulley assembly includes a driven pulley and a retainer. The driven pulley is at least partially disposed about a ball nut that is operatively connected to a rack bar. The retainer is received within the driven pulley. The belt is arranged to connect the driven pulley assembly to the drive pulley.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
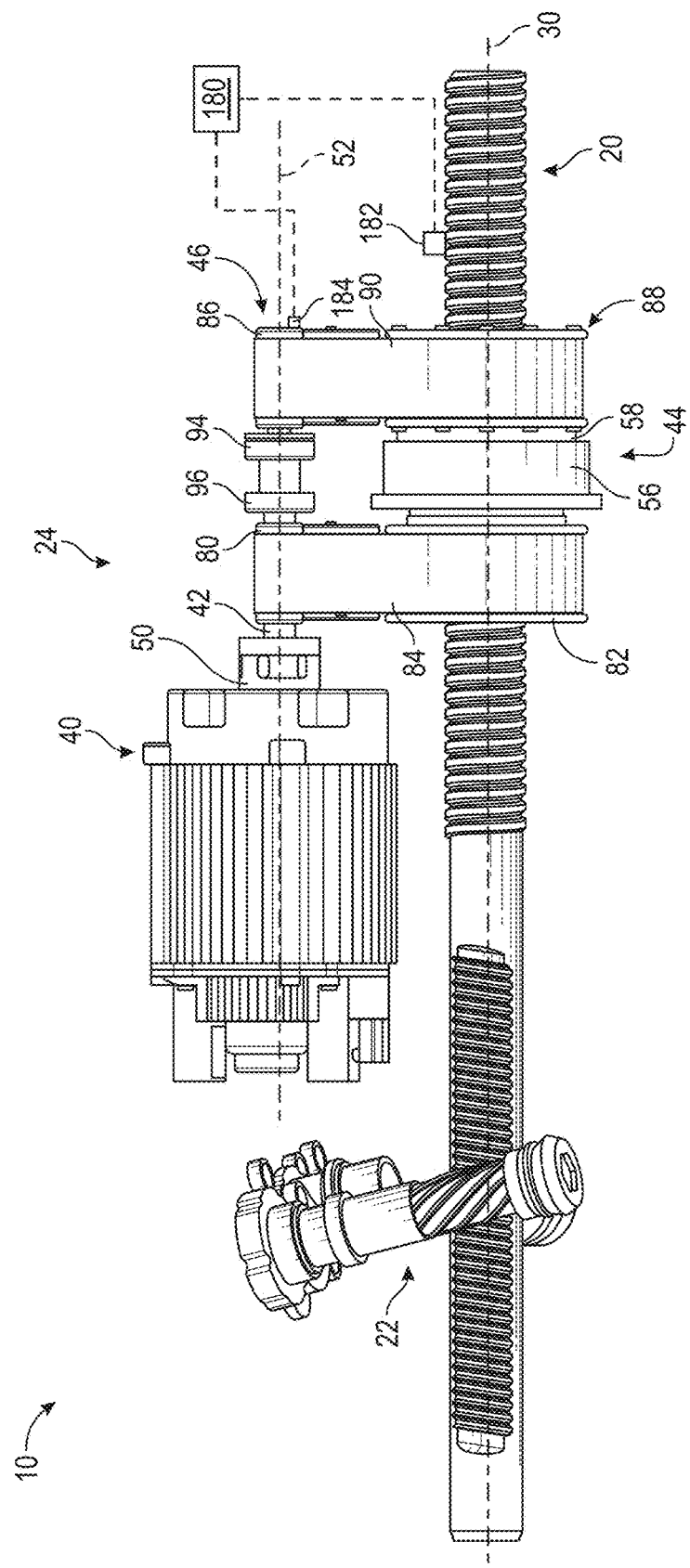
FIG. 1 is a perspective view of a steering assist system with a road wheel actuator assembly.

Vehicles are provided with a steering assist system that pivots or turns a vehicle wheel or road wheel responsive to a steering input provided by an operator of the vehicle. Referring to FIG. 1, the steering assist system includes a road wheel actuator assembly 10 that is arranged to pivot the vehicle wheel or vehicle road wheel. The road wheel actuator assembly 10 includes a rack bar 20, a pinion gear 22, and a power steering assist mechanism 24.

The rack bar 20 extends along a first axis 30 and has ends that are operatively connected to tie rods that aid in pivoting, steering, or turning, a vehicle road wheel. The rack bar 20 is configured as a ball screw having threads, teeth, or the like that engage with the pinion gear 22. The pinion gear 22 is operatively connected to an input shaft and rotates responsive to a steering input provided by an operator of the vehicle. The rotation of the pinion gear 22, while meshingly engaged with the rack bar 20, causes the rack bar 20 to translate along the first axis 30 to pivot a vehicle road wheel.

The power steering assist mechanism 24 is operatively connected to the rack bar 20 and provides an assist torque to the rack bar 20 that is translated into an axial force that is used to aid in pivoting the vehicle road wheel. The power steering assist mechanism 24 includes a motor 40, a drive pulley shaft 42, a ball nut assembly 44, and a pulley assembly 46.

The motor 40 may be an electric motor, hydraulic actuator, an electrohydraulic motor, or the like that is operatively connected to the drive pulley shaft 42. The drive pulley shaft 42 is connected to the motor 40 by a compliant motor coupling 50. The drive pulley shaft 42 extends along a second axis 52 that is disposed substantially parallel to the first axis 30. The drive pulley shaft 42 is free to rotate about the first axis 30 through bearings 94, 96.

Figure 2:
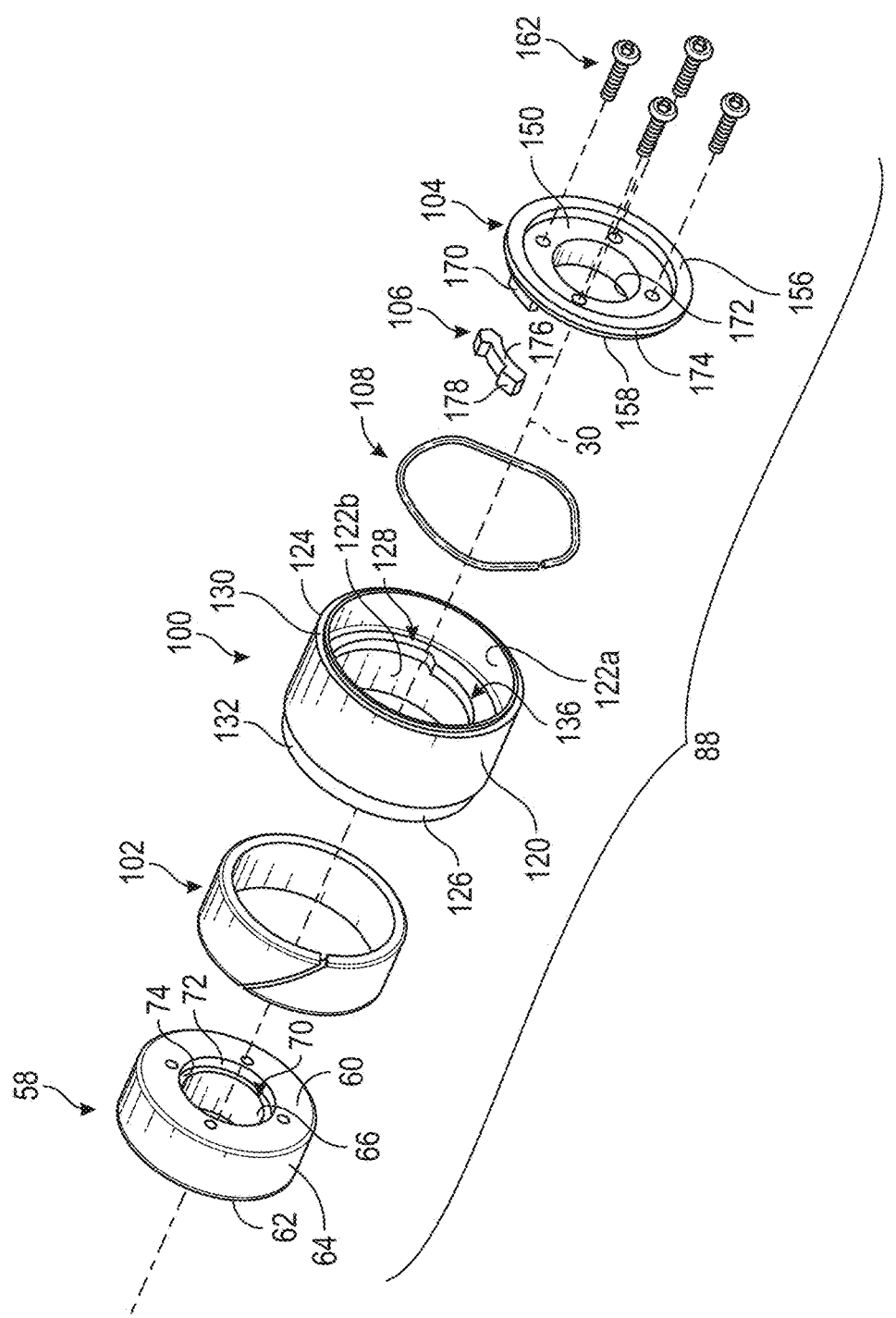
FIG. 2 is a disassembled view of a driven pulley assembly of the road wheel actuator assembly.

Referring to FIG. 1, the ball nut assembly 44 is disposed about the rack bar 20. Referring to FIG. 2, the ball nut assembly 44 includes a bearing 56 that is operatively connected to a ball nut 58 that includes a first ball nut face 60, a second ball nut face 62 that is disposed opposite the first ball nut face 60, an outer ball nut surface 64 that extends between the first ball nut face 60 and the second ball nut face 62 along the first axis 30, and an inner ball nut surface 66 that is disposed concentric with the outer ball nut surface 64 and extends between the first ball nut face 60 and second ball nut face 62 along the first axis 30. The inner ball nut surface 66 meshes with the rack bar 20 through a set of recirculating balls that aid in converting torque applied by the pulley assembly 46 into to an axial force that aids in turning a vehicle road wheel.

Figure 3:
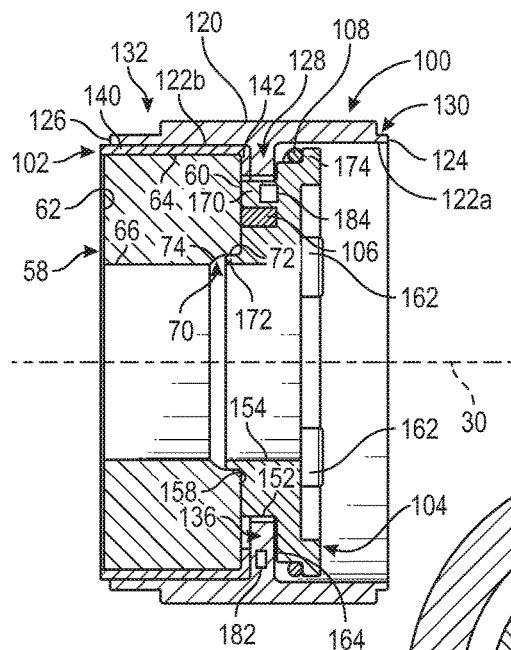
FIG. 3 is a side cross-sectional view of the driven pulley assembly.

Referring to FIGS. 2 and 3, the ball nut 58 of the ball nut assembly 44 includes a recess or a notch 70 that extends between or is defined between the first ball nut face 60 and the inner ball nut surface 66. The notch 70 is defined by a first surface 72 and a second surface 74. The first surface 72 is disposed generally parallel to the first axis 30 and extends from the first ball nut face 60 towards the second ball nut face 62. The second surface 74 extends from the first surface 72 towards the inner ball nut surface 66. The second surface 74 is disposed in a nonparallel and a non-perpendicular relationship with the first axis 30.

Referring to FIG. 1, the pulley assembly 46 extends between the rack bar 20 and the drive pulley shaft 42. The pulley assembly 46 transmits torque from the motor 40 to the ball nut assembly 44. The pulley assembly 46 may be a dual belt pulley system that includes a primary drive pulley 80, a primary driven pulley 82, a primary belt 84, a drive pulley 86, a driven pulley assembly 88, and a belt 90.

The primary drive pulley 80 is disposed about the drive pulley shaft 42. The primary driven pulley 82 is disposed about the rack bar 20 and is operatively connected to the ball nut assembly 44. More specifically, the primary driven pulley 82 engages and is operatively connected to the second ball nut face 62, as shown in FIG. 1. The primary belt 84 is disposed about the primary drive pulley 80 and the primary driven pulley 82 and is arranged to drivably connect the primary drive pulley 80 to the primary driven pulley 82. The primary driven pulley 82 may be provided with flanges that facilitate the retention of the primary belt 84 about the primary driven pulley 82.

The drive pulley 86 is disposed about the drive pulley shaft 42 and is fixed to the drive pulley shaft 42 through an interference fit. The driven pulley assembly 88 is disposed about the rack bar 20 and is spaced apart from the primary driven pulley 82 by the ball nut assembly 44. The driven pulley assembly 88 is operatively connected to the first ball nut face 60. The belt 90 is disposed about the drive pulley 86 and the driven pulley assembly 88 and is arranged to drivably connect the drive pulley 86 to the driven pulley assembly 88.

The primary belt 84 and the belt 90 are tensioned by idler pulleys that are supported by an eccentric shaft. The centering of the ball nut assembly 44 between the primary belt 84 and the belt 90 facilitates the balancing of belt tension forces and may reduce a moment load that may be applied to a bearing of the ball nut assembly 44.

The pulley assembly 46 is arranged or configured to operate in a first mode of operation and a second mode of operation. The primary belt 84 transmits substantially 100% of the load that is applied by the motor 40 to the primary drive pulley 80 and to the ball nut assembly 44 through the primary driven pulley 82 to provide an assist load to aid in the pivoting of at least one vehicle road wheel, while the pulley assembly 46 is operating in the first mode of operation. The belt 90 transmits substantially 100% of the load is applied by the motor 40 to the drive pulley 86 and to the ball nut assembly 44 through the driven pulley assembly 88 to provide an assist load to aid in pivoting of at least one vehicle road wheel, while the pulley assembly 46 is operating in the second mode of operation.

Referring to FIGS. 2 and 3, the driven pulley assembly 88 is allowed a predetermined amount of rotational free movement such that the belt 90 rotates with the primary belt 84 but the belt 90 remains unloaded and load is not transferred, while the pulley assembly 46 is operating in the first mode of operation. The driven pulley assembly 88 includes a driven pulley 100, a bearing member 102, a retainer 104, a damper 106, and a biasing member 108.

The driven pulley 100 is disposed about and is spaced apart from the rack bar 20. The driven pulley 100 is axially located between the ball nut assembly 44 and the retainer 104. The driven pulley 100 is at least partially disposed about the ball nut assembly 44. The driven pulley 100 includes an exterior surface 120 and an interior surface 122 that is disposed opposite the exterior surface 120. The exterior surface 120 and an interior surface 122 both extend between a first driven pulley end 124 and a second driven pulley end 126. The exterior surface 120 engages a portion of the belt 90. The interior surface 122 is provided with a protrusion, tab, or extension 128 that extends from the interior surface 122 towards the first axis 30. The extension 128 circumferentially extends about a portion of the interior surface 122.

The extension 128 may separate the interior surface 122 into a first interior surface 122a and a second interior surface 122b. The first interior surface 122a extends from the extension 128 to the first driven pulley end 124 and the second interior surface 122b extends from the extension 128 to the second driven pulley end 126.

The driven pulley 100 may have a first inner diameter that is measured across the first interior surface 122a proximate the first driven pulley end 124 and may have a second inner diameter that is measured across the second interior surface 122b proximate the second driven pulley end 126. The first diameter may be different from the second diameter. For example, the first diameter may be greater than or may be less than the second diameter.

The exterior surface 120 defines a first notch 130 that is disposed proximate the first driven pulley end 124 and a second notch 132 that is disposed proximate the second driven pulley end 126. The first notch 130 extends axially from the first driven pulley end 124 towards the second driven pulley end 126. The first notch 130 extends radially from the exterior surface 120 towards the interior surface 122. The second notch 132 extends axially from the second driven pulley end 126 towards the first driven pulley end 124. The second notch and 132 extends radially from the exterior surface 120 towards the interior surface 122.

The driven pulley 100 defines or is provided with a driven pulley protrusion 136. The driven pulley protrusion 136 may radially extend directly from the interior surface 122 or may radially extend from the extension 128 towards the first axis 30 and the retainer 104. The driven pulley protrusion 136 is axially disposed between the first driven pulley end 124 and the second driven pulley end 126. The driven pulley protrusion 136 is configured as a tang that circumferentially extends about a portion of the interior surface 122 of the driven pulley 100. The driven pulley protrusion 136 may extend from the extension 128.

The bearing member 102 is disposed between the ball nut assembly 44 and the driven pulley 100. The bearing member 102 may be configured as a bushing having a main body 140 and an extension 142 that extends from the main body 140. The main body 140 engages the outer ball nut surface 64 and the interior surface 122 of the driven pulley 100. The extension 142 is disposed generally perpendicular to the main body 140 and is at least partially disposed between the driven pulley protrusion 136 and the ball nut assembly 44. The extension 142 engages the first ball nut face 60 and the driven pulley protrusion 136.

The retainer 104 is at least partially disposed within and is spaced apart from the driven pulley 100. The retainer 104 includes a retainer body 150 that is disposed about the rack bar 20. The retainer body 150 includes an outer surface 152 and an inner surface 154 disposed opposite the outer surface 152. The outer surface 152 and the inner surface 154 each extend between a first retainer end 156 and a second retainer end 158 along the first axis 30. The second retainer end 158 engages the first ball nut face 60.

The outer surface 152 of the retainer 104 is radially spaced apart from an interior surface of the driven pulley 100 such that a clearance slot 160 is defined between the driven pulley 100 and the retainer 104. The driven pulley 100 is rotationally isolated from the ball nut assembly 44 by the clearance slot 160.

The retainer 104 is operatively connected to the ball nut assembly 44 by at least one fastener 162 that extends through the retainer body 150 and extends into or through the first ball nut face 60. The at least one fastener 162 enables the ball nut assembly 44 and the retainer 104 to rotate together about the first axis 30.

A portion of the driven pulley protrusion 136 engages the outer surface 152 of retainer body 150. In at least one embodiment, a portion of the driven pulley protrusion 136 engages a shelf 164 that is defined by the retainer body 150 that is disposed generally parallel to the first ball nut face 60, the driven pulley protrusion 136, and at least one of the first retainer end 156 and the second retainer end 158.

The retainer 104 includes a retainer protrusion 170, a retainer pilot 172, and a retainer flange 174. The retainer protrusion 170 is disposed proximate the second retainer end 158 and radially extends from the outer surface 152 of the retainer body 150 towards the surface 128 of the driven pulley 100. The retainer protrusion 170 is configured as a tang that circumferentially extends about a portion of the outer surface 152 of the retainer body 150.

The retainer pilot 172 axially extends from the second retainer end 158 and is at least partially received within the notch 70 of the ball nut assembly 44. The retainer pilot 172 engages at least one of the first surface 72 and the second surface 74 of the notch 70 of the ball nut assembly 44. The retainer pilot 172 is a pilot feature that locates the retainer 104 coaxially to the ball nut assembly 44.

The retainer flange 174 is disposed proximate the first retainer end 156 and radially extends from the outer surface 152 of the retainer body 150 towards the interior surface 122 of the driven pulley 100. The retainer flange 174 is axially spaced apart from the retainer protrusion 170.

The damper 106 is disposed about a portion of the retainer protrusion 170. The damper 106 includes a damper body 176 having at least one damper arm 178 extending from the damper body 176. The damper body 176 and the at least one damper arm 178 engages the retainer protrusion 170 to hold the damper 106 in position. The damper 106 is a compliant member arranged to absorb impulses, impacts, or shock as the damper 106 and the retainer protrusion 170 engage the driven pulley protrusion 136 to reduce belt to drive pulley tangential force and reduces risk of slipping or skipping of the belt 90 during the transition from the first mode of operation to the second mode of operation of the pulley assembly 46.

Figure 4:
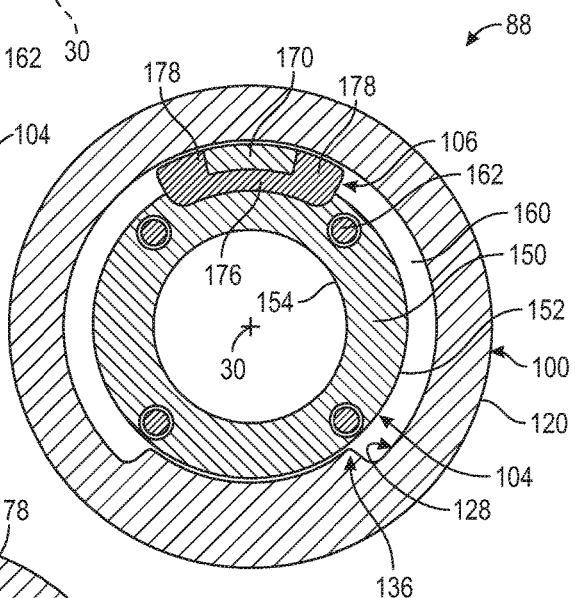
FIG. 4 is an end cross-sectional view of the driven pulley assembly during a first mode of operation.

Relative angular motion between the driven pulley 100 and the ball nut assembly 44 is limited by the driven pulley protrusion 136 contacting the damper 106. For example, while the pulley assembly 46 is operating in the first mode of operation, the damper 106 and the retainer protrusion 170 are radially or angularly spaced apart from the driven pulley protrusion 136 such that the driven pulley protrusion 136 is generally centered within the clearance slot 160 and does not transmit torque to either of the retainer 104 and the ball nut assembly 44, facilitating relative angular rotation or motion between the driven pulley 100 and the ball nut assembly 44 about the first axis 30 and facilitating relative angular rotation between the primary driven pulley 82 and the driven pulley assembly 88, as shown in FIG. 4. Furthermore, as the primary belt 84 and the belt 90 are tensioned, the driven pulley protrusion 136 may move slightly off center to accommodate misalignment between the helices of the pulleys eliminating the need to time the primary drive pulley 80 and the drive pulley 86 to one another and eliminating the need to time the primary driven pulley 82 and the driven pulley assembly 88 to one another to achieve a desired belt tension.

Figure 5:
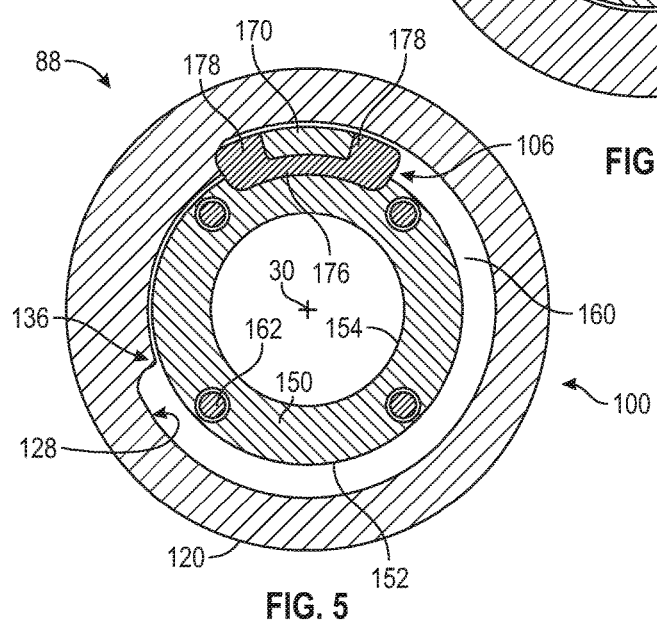
FIG. 5 is an end cross-sectional view of the driven pulley assembly during a second mode of operation.

In a further example, responsive to slipping or skipping of the primary belt 84 or a decrease or loss of tension of the primary belt 84, at least one of the damper 106 and the retainer protrusion 170 rotates towards the driven pulley protrusion 136. Responsive to engagement between the retainer protrusion 170 and at least one of the damper 106 and the retainer protrusion 170, the retainer 104, the driven pulley 100, and the ball nut assembly 44 are facilitated to rotate together about the first axis 30 to enable the transferring of load by the belt 90 and the changing of the mode of operation of the pulley assembly 46 from the first mode of operation to the second mode of operation, as shown in FIG. 5.

Referring to FIG. 1, a vehicle monitoring system 180 may be in communication with the pulley assembly 46 and is arranged to detect a slip or skip event or loss of tension of at least one of the primary belt 84 and the belt 90. The vehicle monitoring system 180 is in communication with a first position sensor 182 and a second position sensor 184. The first position sensor 182 is positioned to provide a first signal indicative of a position of the rack bar 20, as shown in FIG. 1, or may be positioned to provide a first signal indicative of a position of the driven pulley protrusion 136, as shown in FIG. 3. The second position sensor 184 is positioned to provide a second signal indicative of a position of the motor 40, or the drive pulley shaft 42, as shown in FIG. 1, or may be positioned to provide a second signal indicative of a position of the retainer protrusion 170, as shown in FIG. 3. The vehicle monitoring system 180 is configured to output an indicator or a warning light to an operator of the vehicle responsive to a difference between the first signal and the second signal being greater than a threshold. The indicator notifies an operator to service the vehicle or notifies the operator of a change in the mode of operation of the pulley assembly 46 from the first mode of operation to the second mode of operation.

The biasing member 108 is disposed between the retainer flange 174 and the driven pulley protrusion 136. The biasing member 108 is arranged to urge the driven pulley protrusion 136 towards engagement with the extension 142 of the bearing member 102 and/or the biasing member 108 is arranged to urge the driven pulley protrusion 136 towards engagement with the first ball nut face 60 of the ball nut assembly 44.

The biasing member 108 may be a spring that takes up axial clearance between the retainer 104, the driven pulley 100, the extension 142 of the bearing member 102, and the ball nut assembly 44. The biasing member 108 is sized to preload the driven pulley 100 into the bearing member 102 and the ball nut assembly 44 with a force that is greater than the belt 90 axial thrust force to keep the driven pulley 100 in contact with the bearing member 102. Biasing member 108 may be sized to achieve a specified driven pulley slipped torque while operating on the belt 90 to define a steering maneuver during which pulley slipped occurs. The changing of biasing member 108 preload enables a control upon which pulley slipped may occur. For example a small biasing member preload allows driven pulley slip during higher vehicle speed/low assist maneuvers and a larger biasing member preload delays driven pulley slip until lower vehicle speed/high load parking maneuvers.

In at least one embodiment, the drive pulley 86 may be configured in a similar manner as the aforedescribed driven pulley assembly 88 such that the drive pulley 86 is allowed a predetermined amount of rotational free movement such that the belt 90 rotates with the primary belt 84 of the belt 90 remains unloaded and load is not transferred, while the pulley assembly 46 is operating in the first mode of operation.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the present disclosure, it is claimed:

1. A road wheel actuator assembly, comprising:
    a rack bar that extends along a first axis; and
    a pulley assembly, comprising:
        a drive pulley disposed about a drive pulley shaft that extends along a second axis that is disposed parallel to the first axis, and
        a driven pulley assembly disposed about the rack bar, the driven pulley assembly including:
            a ball nut that is disposed about the rack bar,
            a driven pulley having an interior surface that is at least partially disposed about the ball nut and a driven pulley protrusion that extends from the interior surface towards the first axis,
            a retainer that is at least partially disposed within the driven pulley and is operatively connected to the ball nut, the retainer has a retainer flange and a retainer protrusion that extend from an outer surface of the retainer towards the interior surface, and
            a biasing member that is disposed between the retainer flange and the driven pulley protrusion.

2. The road wheel actuator assembly of claim 1, wherein the interior surface of the driven pulley is spaced apart from the outer surface of the retainer defining a clearance slot.

3. A steering assist system having a road wheel actuator assembly, comprising:
    a rack bar that extends along a first axis; and
    a pulley assembly, comprising:
        a drive pulley disposed about a drive pulley shaft that extends along a second axis that is disposed parallel to the first axis, and
        a driven pulley assembly disposed about the rack bar, the driven pulley assembly including:
            a ball nut that is disposed about the rack bar,
            a driven pulley at least partially disposed about the ball nut, the driven pulley includes an interior surface having a driven pulley protrusion that extends from the interior surface towards the first axis, and
            a retainer that is at least partially disposed within the driven pulley and is operatively connected to the ball nut, the retainer has a retainer protrusion that extends from an outer surface of the retainer towards the interior surface of the driven pulley,
            the driven pulley is arranged to rotate relative to the ball nut while the driven pulley protrusion is spaced apart from the retainer protrusion.

4. The road wheel actuator assembly of claim 3, wherein the driven pulley assembly further includes a damper that is disposed about the retainer protrusion.

5. The road wheel actuator assembly of claim 4, wherein the driven pulley is arranged to rotate with the ball nut while the driven pulley protrusion is engaged with at least one of the damper and the retainer protrusion.

6. A pulley assembly of a road wheel actuator assembly, comprising:
    a driven pulley assembly comprising:
        a driven pulley that is at least partially disposed about a ball nut that is operatively connected to a rack bar, the driven pulley includes a driven pulley protrusion that extends towards a retainer,
        a bearing member disposed between the ball nut and the driven pulley, and
        the retainer received within the driven pulley, the retainer includes a retainer protrusion that extends towards the driven pulley and a retainer flange that is spaced apart from the retainer protrusion and extends towards the driven pulley;
    a drive pulley;
    a belt arranged to connect the driven pulley assembly to the drive pulley; and
    a biasing member that is disposed between the retainer flange and the driven pulley protrusion.

7. The pulley assembly of claim 6, wherein the bearing member is at least partially disposed between the driven pulley protrusion and the ball nut.

8. The pulley assembly of claim 6, wherein the biasing member urges the driven pulley protrusion towards engagement with the bearing member.

9. The pulley assembly of claim 6, further comprising a damper disposed about the retainer protrusion.

10. The pulley assembly of claim 6, wherein the retainer is radially spaced apart from the driven pulley and is operatively connected to the ball nut.

11. The pulley assembly of claim 10, wherein the driven pulley rotates relative to the retainer while the driven pulley protrusion is spaced apart from the retainer protrusion.

12. The pulley assembly of claim 11, wherein the driven pulley and the retainer rotate together while the driven pulley protrusion engages the retainer protrusion.

13. A pulley assembly, comprising:
    a driven pulley assembly comprising:
        a driven pulley that is at least partially disposed about a ball nut that is operatively connected to a rack bar, the driven pulley includes a driven pulley protrusion, and
        a retainer received within the driven pulley, the retainer having a retainer protrusion that extends towards the driven pulley;
    a damper disposed about the retainer protrusion;
    a drive pulley; and
    a belt arranged to connect the driven pulley assembly to the drive pulley, the driven pulley is arranged to rotate with the ball nut while the driven pulley protrusion is engaged with at least one of the damper and the retainer protrusion.

14. The pulley assembly of claim 13, wherein the driven pulley rotates relative to the retainer while the driven pulley protrusion is spaced apart from at least one of the damper and the retainer protrusion.

* * * * *